US012341863B2

(12) United States Patent
Blair (10) Patent No.: US 12,341,863 B2
(45) Date of Patent: Jun. 24, 2025

(54) SYSTEMS AND METHODS FOR DETECTING LOST PACKETS IN AN EVENT-BASED COMMUNICATION SYSTEM

(71) Applicant: Schneider Electric USA, Inc., Andover, MA (US)

(72) Inventor: Richard Andrew Blair, Plaistow, NH (US)

(73) Assignee: Schneider Electric USA, Inc., Boston, MA (US)

( * ) Notice: Subject to any disclaimer, the term of this patent is extended or adjusted under 35 U.S.C. 154(b) by 734 days.

(21) Appl. No.: 17/676,880

(22) Filed: Feb. 22, 2022

(65) Prior Publication Data

US 2023/0269309 A1 Aug. 24, 2023

(51) Int. Cl.
*H04L 69/164* (2022.01)
*H04L 1/08* (2006.01)
(Continued)

(52) U.S. Cl.
CPC .............. *H04L 69/164* (2013.01); *H04L 1/08* (2013.01); *H04L 43/08* (2013.01); *H04L 67/145* (2013.01)

(58) Field of Classification Search
CPC ......... H04L 69/164; H04L 1/08; H04L 43/08; H04L 67/145; H04L 2001/0093; H04L 1/1887
See application file for complete search history.

(56) References Cited

U.S. PATENT DOCUMENTS 7,076,803 B2 * 7/2006 Bruton, III .......... H04L 63/1408
714/48
10,033,602 B1 * 7/2018 Russell ............... H04L 43/0835
(Continued)

FOREIGN PATENT DOCUMENTS

| CN | 101980468 A | 2/2011 |
|---|---|---|
| JP | H11355273 A | 12/1999 |
| WO | 2021249651 A1 | 12/2021 |

OTHER PUBLICATIONS

European Search Report and Search Opinion dated Jul. 18, 2023 for corresponding European Patent Application No. 23157660.4, 9 pages.
(Continued)

*Primary Examiner* — Hoang-Chuong Q Vu
(74) *Attorney, Agent, or Firm* — Troutman Pepper Locke LLP (57) ABSTRACT

A method is provided to detect a lost packet in an event-based communication system which uses a communication protocol without error correction or recovery. The method includes maintaining a plurality of counters for tracking an overall count of data packets transmitted, and a count of data packets transmitted for each event-type; and transmitting a sequence of data packets to at least one remote device. Each data packet includes information of an event-type from the plurality of different event-types and count information associated with the counters. The method further involves receiving a message from the at least one remote device that at least one data packet from the sequence of transmitted data packets is lost based on the count information from at least one transmitted data packet; and taking at least one action in response to the message.

30 Claims, 6 Drawing Sheets

(51) Int. Cl.
*H04L 43/08* (2022.01)
*H04L 67/145* (2022.01)

(56) References Cited

U.S. PATENT DOCUMENTS

| | | | | |
|---|---|---|---|---|
| 10,080,193 | B1* | 9/2018 | Bleu-Laine | H04W 52/0212 |
| 2004/0165527 | A1* | 8/2004 | Gu | H04L 65/1101 |
| | | | | 370/229 |
| 2006/0285500 | A1* | 12/2006 | Booth, III | H04L 43/0829 |
| | | | | 370/250 |
| 2009/0135735 | A1* | 5/2009 | Zhang | H04L 65/65 |
| | | | | 370/253 |
| 2009/0199209 | A1* | 8/2009 | Arimilli | G06F 9/542 |
| | | | | 719/314 |
| 2010/0322095 | A1* | 12/2010 | Okada | H04L 43/0835 |
| | | | | 370/252 |
| 2019/0207835 | A1* | 7/2019 | Lohiya | H04L 43/067 |
| 2024/0427304 | A1* | 12/2024 | Cui | G05B 19/052 |

OTHER PUBLICATIONS

European Examination Report dated Apr. 15, 2025 for corresponding EP Application No. 23157660.4, 5 pages.

\* cited by examiner

402 — Maintain a plurality of counters for tracking (1) an overall count of data packets transmitted, and (2) a count of data packets transmitted for each event-type

404 — Transmit a sequence of data packets to at least one remote device, each event data packet including information of an event-type from the plurality of different event-types and count information associated with the counters

406 — Update at least some of the plurality of counters with the transmission of each data packet

408 — Receive a message from the at least one remote device that at least one data packet from the sequence of transmitted data packets is lost or missing based on the count information from at least one transmitted event data packet

410 — Take at least one action in response to the message

TABLE 1 – SAMPLE PACKET SEQUENCE

600

| Seq Num (Overall Counter) 610 | Pkt/Evt Type 620 | Event-Type (1) Counter (Event Seq Num) 630 | Event-Type (2) Counter KeepAlive Seq Num 640 |
|---|---|---|---|
| 1 | Keepalive | 0 | 1 |
| 2 | Keepalive | 0 | 2 |
| 3 | Keepalive | 0 | 3 |
| 4 | Event | 1 | 3 |
| 5 | Keepalive | 1 | 4 |
| 6 | Event | 2 | 4 |
| 7 | Keepalive | 2 | 5 |
| 8 | Event | 3 | 5 |
| 9 | Event | 4 | 5 |
| 10 | Event | 5 | 5 |
| 11 | Event | 6 | 5 |
| 12 | Keepalive | 6 | 6 |
| 13 | Keepalive | 6 | 7 |
| 14 | Event | 7 | 7 |
| 15 | Keepalive | 7 | 8 |

FIG. 6

SYSTEMS AND METHODS FOR DETECTING LOST PACKETS IN AN EVENT-BASED COMMUNICATION SYSTEM

TECHNICAL FIELD

The present disclosure relates to an event-based communication system, and more particularly, to detecting lost data packets in an event-based communication system and taking different actions based on which type of packet is lost.

BACKGROUND

In traditional control systems, cyclic communication is used to transfer data between entities. In case a single packet is missed, the data is simply overwritten in the next communication cycle. As long as the lost (or missing) packet, including the data contained within, does not cause unexpected failures, this mechanism may work well. Event traffic is quite different, which involves transferring event data only upon the occurrence of the event. Events can occur in rapid succession or infrequently. Typically, the event data is sent only once upon its occurrence. In case of infrequent events, a packet containing no data (referred herein as a "keepalive" or KA packet) is sent at a predetermined interval from the previous event or keepalive packet to let the receiving entity know that the sender is still there, for example, when no event is detected or has occurred. If no packets are received for an extended period of time (usually a multiple of the keepalive interval), the receiving entity will timeout and inform its application of loss of communication. For non-realtime communication, protocols like Transmission Control Protocol/Internet Protocol (TCP/IP) can be used to guarantee event packet delivery. However, this and other similar types of protocol may be too slow for realtime communication, so protocols like User Datagram Protocol (UDP) may be used. However, UDP provides no packet delivery guarantee (e.g., no error correction or recovery).

SUMMARY

In accordance with an embodiment, a system and method are provided for detecting a lost packet in an event-based communication system configured to enable communication of a plurality of different event-types using a communication protocol without error correction or recovery. The method and system can involve maintaining a plurality of counters for tracking (1) an overall count of data packets transmitted, and (2) a count of data packets transmitted for each event-type; and transmitting a sequence of data packets to at least one remote device. Each data packet can include information of an event-type from the plurality of different event-types and count information associated with the counters for tracking (1) the overall count number of data packets transmitted, and (2) the count of data packets transmitted for each event-type from the plurality of different event-types. At least some of the plurality of counters are updated with the transmission of each data packet. The method further involves receiving a message from the at least one remote device that at least one data packet from the sequence of transmitted data packets is lost based on the count information from at least one transmitted data packet; and taking at least one action in response to the message. The count information enables determination of the event-type of the at least one data packet that is lost In various embodiments, the count information of a data packet can comprise of a current overall count of the number of data packets transmitted, and current event-type count of the number of data packets transmitted for each of the event-types, when the data packet is transmitted.

The communication protocol can comprise of User Datagram Protocol (UDP). The count information also can be provided in a payload of the data packet. Furthermore, the action can comprise of selectively re-transmitting the lost data packet according to its event-type.

In various embodiments, the event-types can include a keepalive-type of packet. The method can further involve resetting the plurality of counters after data packets of the keepalive-type have been transmitted consecutively for a time period, which satisfies a reset time period or condition.

In various embodiments, the sequence of data packets are multicasted to a plurality of remote devices, which comprise a plurality of industrial controllers that are configured to perform functions according to event information received from the sequence of data packets, the functions being associated with an operation or monitoring of an industrial process or system or equipment associated therewith.

In accordance with another embodiment, a system and method are provided for detecting a lost packet in an event-based communication system configured to enable communication of a plurality of different event-types using a communication protocol without error correction or recovery. The system and method can involve receiving from a remote device a sequence of data packets. Each data packet includes information of an event-type from the plurality of different event-types and count information from a plurality of counters for tracking (1) an overall count of data packets transmitted from the remote device, and (2) a count of data packets transmitted from the remote device for each event-type from the plurality of different event-types. The system and method further involve determining whether at least one data packet is lost based on the count information from at least one of the received data packets; and taking an action in response to the determination of at least one lost data packet. The count information further enables determination of the event-type of the at least one data packet that is lost In some embodiments, the action comprises transmitting a message to the remote device for the determined at least one data packet which is lost. The system and method can further involve receiving the at least one data packet which was identified in the message as being lost from the remote device, in response to the message.

The count information of a data packet can comprise of a current overall count of the number of data packets transmitted, and current event-type count of the number of data packets transmitted for each of the event-types, when the data packet is transmitted. Furthermore, the communication protocol can comprise UDP. The count information also can be provided in a payload of the data packet. The event-types also can include a keepalive-type of packet.

In a further embodiment, a system and method are provided for detecting lost packets in an event-based communication system (e.g., UDP-based communication system). The system and method involve generating and communicating, from a first entity to a second entity, an event data packet upon each occurrence of an event in the system, or a keepalive data packet in the absence of an event or after a predetermined time period has elapsed since a last data packet was communicated. The event data packet and the keepalive data packet including: a first sequence counter that is incremented for each communicated data packet, a second sequence counter that is incremented for each communicated keepalive data packet, and a third sequence counter that is incremented for each communicated event data packet.

The system and method further involve, upon receiving each communicated data packet and each communicated keepalive data packet on the second entity, determining if a gap exists between an expected overall data packet count value associated with the third sequence counter and an actual overall data packet count value on the second entity. The gap between the expected overall data packet count value and the actual overall data packet count value is indicative of a lost data packet and/or a lost keepalive data packet. The system and method also involve, in response to determining a gap exists between the expected overall data packet count value and the actual overall data packet count value, determining if a gap exists between an expected event data packet value associated with the third sequence counter and an actual event data packet value on the second entity, or between an expected keepalive data packet value associated with the second sequence counter and an actual keepalive data packet value on the second entity. The gap between the expected event data packet value and the actual event data packet value is indicative of a lost data packet, and the gap between the expected keepalive data packet value and the actual keepalive data packet value is indicative of a lost keepalive data packet.

The system and method can further involve taking one or more actions in response to determining a gap exists between the expected event data packet value and the actual event data packet value, or between the expected keepalive data packet value and the actual keepalive data packet value. In various embodiments, the one or more actions taken in response to determining a gap exists between the expected data packet value and the actual data packet value, include: sending a communication from the second entity to the first entity indicating the lost data packet. The system and method also can further involve recommunicating the lost data packet from the first entity to the second entity.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

DETAILED DESCRIPTION

The present disclosure is directed to systems and methods for detecting missed packet types in a communication network when multiple types of messages are present. The systems and methods can utilize multiple counters embedded in a data packet that can be analyzed by a receiving entity (or recipient) to ascertain if any packets are lost or missed. The systems and methods can be implemented in event-based communication systems which utilize communication protocol that may not guarantee delivery, e.g., no error correction or recovery.

A communication system can incorporate a sequence counter such as an overall sequence or packet counter (also referred to herein as "overall counter") into each data packet. In an event-based system, the data packet comprises an event data packet. The data packet can contain information indicating an occurrence (or non-occurrence) of an event or information associated therewith. The overall counter can be incremented for each transmitted data packet. The counter information from the overall counter can allow a receiving entity to determine whether one or more packets have been lost in the sequence of transmitted data packets. However, the receiving entity would not be capable of reliably discerning whether the lost packet(s) is of a particular packet type (e.g., an event packet or a keepalive packet). In accordance with various embodiments, the systems and methods can incorporate additional information, e.g., additional data fields, into each data packet to allow a receiving entity to reliably detect which type of packets were missed so that appropriate action can be taken as necessary. For example, if a keepalive packet is missed, no action may be needed (e.g., unless, of course, sufficient data packets are missed leading to a timeout situation). If a packet with event data is missed, a retransmission request can be implemented or an error can be indicated to the entity's application for processing.

In various embodiments, the systems and methods can add separate sequence counters in each data packet concerning each different packet type (e.g., each event-type from a plurality of different event-types that may be communicated by the data packets). These additional counters for each packet/event type can also be referred to herein as "packet-type" counters in general or "event-type" counters when dealing with event-based communication. The sequence counters can be incorporated into the payload, header or other location in each data packet. These sequence counters can be incremented for every newly transmitted packet of a particular type. For example, as previously discussed, an overall counter (or its count) can be present in the data packet, which is independent of the packet type. The overall packet counter may be used as the initial indicator of a lost packet. In an example of a two packet/event-type scenario, there may be two types of packet data, namely an event data packet and a keepalive data packet (or "no event" or "no detected-event" type of packet). Accordingly, in this example, there may be three (3) sequence counters: an overall counter, and an event-type counter for each of the two packet/event types (e.g., one counter that is incremented for data packet, and another one for keepalive packet). While it is possible to only include an overall counter and an event-type sequence counter for one of the two packet types (e.g., an overall counter and N−1 event-type counters, where N is a number of event-types of packet data), for robustness, the systems and methods can be configured so that each type of data packet contains all three counters (or their counts) for this example. Furthermore, in various embodiments, each data packet may represent only one event-type (e.g., a single event-type), or a detection or occurrence of one event-type.

It should be understood that the incorporation of counter information (also referred to as "count information") in each data packet can be implemented for communication scenarios with more than two packet/event types, where each data packet may be configured to include count information for (1) overall sequence counter and (2) the sequence counters for each type of data packet (e.g., N sequence counters for N types of data packets). The sequence counters for each type of data packet may be analyzed if a gap is detected in the overall sequence counter.

In various embodiments, the counter-based communication approach of the systems and methods, described herein, can be incorporated into any event-based communication system, such as OPC UA PubSub communication, which may be employed in an industrial control system for monitoring and/or controlling an industrial process or system or equipment thereof. For example, in such industrial environments, it is possible to use UDP communication and still detect if any important packets were missed when multiple types of packets are present.

Accordingly, the systems and methods of the present disclosure can enhance the reliability of data communication in applications, which employ communication protocols (or the like) that may not guarantee reliable delivery (e.g., no error correction or recovery), without significantly impacting communication speed for realtime communication of event data. The primary performance implication on the receiving entity (or its receiver) would be slightly longer data packets.

These and other features of the present disclosure will be described in further detail below with reference to the example figures.

Figure 1:
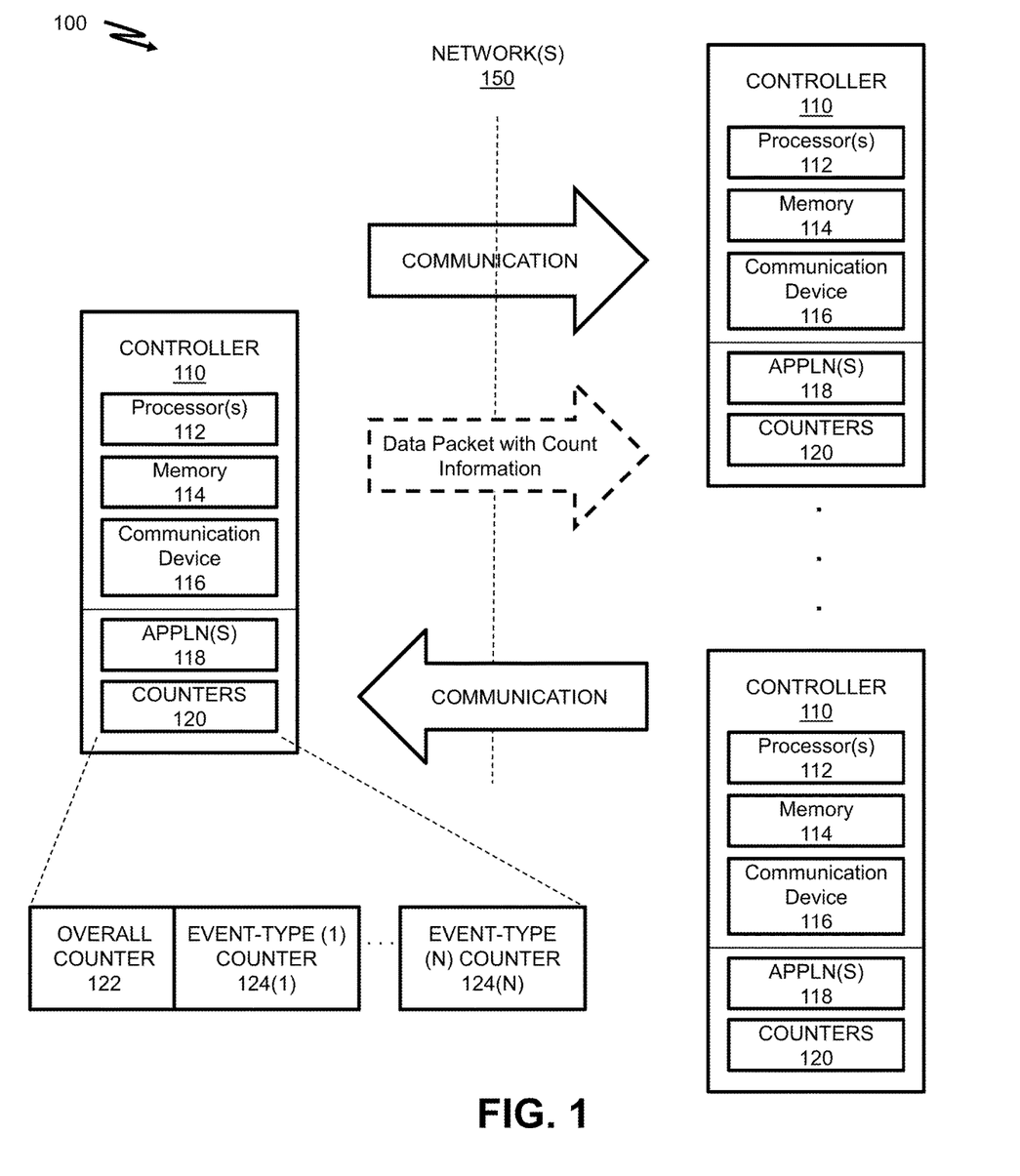
FIG. 1 is a block diagram illustrating an example control system employing an event-based communication system, in accordance with an embodiment.

FIG. 1 illustrates an example control system 100, which includes a plurality of electronic devices that can communicate across one or more networks 150. The network 150 can be a wireline network(s), wireless network(s) or a combination thereof. The control system 100 can be an industrial control system, which can monitor and/or control an industrial process or system or equipment thereof, and can include (or interact with) other equipment such as sensors, valves, actuators, motors, etc. which may be employed in the industrial process or system.

In this example, the electronic devices can be a plurality of controllers 110, which can communicate and cooperate with each other over the network 150 using a communication protocol that does not require error correction or recovery, or other communication-verification processes which may significantly slow down data communication. Each controller 110 can, for example, transmit packet data, such as event data, to other remote device(s), such as other controller(s) 110 or electronic devices, so they can perform functions and operations associated with the monitoring or controlling of the industrial process or system (or other operations). The packet transmission can be unicast or multicast. In various embodiments, the communication protocol can, for example, be UDP, but may be other types of communication protocols which do not guarantee reliable data communication, or employ error correction or recovery.

Each controller 110 can include at least one processor(s) 112, at least one memory 114, and at least one communication device(s) 116 (e.g., transmitter/receiver) for transmitting and receiving data via the network 150. The controller 110 can be a computer or computing device, such as an industrial computer or controller. In various embodiments, the processor 112 can be configured to control the operations of the controller 100, such as the implementation of various applications 118 and counters 120 as well as other functions including but not limited to communication of data to other remote devices via the communication device 116, processing of data including event data and other messages, and other functions and operations described herein.

The applications 118 may include computer applications, which can implement various sub-operations and sub-functions associated with the control and monitoring of the industrial process or system according to event data and/or other data.

The counters 120 may include a plurality of sequence counters, such as "overall" and "event-type" counters for tracking a sequence of data packets and their event types, which have been transmitted. The counters 120 (or their count information) may be maintained and updated locally at the controller 110, as well as with each transmitted data packet. In this way, it is possible for a receiving entity, such as a remote device, to determine whether any data packets have been lost as well as the event-type of any lost packet, based on the counters or count information added to each transmitted data packet. In this example, the counters 120 can include an overall counter 122, and event-type counters 124, where N is the number of event-types of transmittable packets. The overall counter 122 can track an overall number of sequentially transmitted data packets. The event-type counters 124 can track the number of event-types which have been transmitted in the sequentially transmitted data packets. In various embodiments, the systems and methods may employ one overall counter and event-type counters for each event type (e.g., N event-type counters); however, the identification of lost packets, including the type of lost packet, can be determined using count information from an overall counter and N−1 event-type counters, using N-event type counters, or count information from other combinations of counters.

Furthermore, in some embodiments, the number and category of event-types can be predefined in the control system 100, or can be dynamically updated as new event-types are added or deleted from the control system 100. For example, event-type counters and their count information can be automatically added or omitted from each of the controller 110 in the control system 100 and the count information of packets (including their types) to be transmitted, when the control systems are updated to add or delete event-types from the control system 100.

The memory 114 can store any data required by the processor(s) 112 for performing functions related to the operation of the controller 110 (and its components), including but not limited to the storing of executable code for application or other programs, event types, event data, keepalive timers, counters, and so forth. The memory 114 can be integrated with the controller 110, or the memory 114 can be external and remotely coupled to the controller 110. The memory 114 can be, for example, random access memory (RAM), electronic erasable programmable read only memory (EEPROM), flash memory, or other volatile or non-volatile memory (i.e., non-transitory computer readable media).

Figure 2:
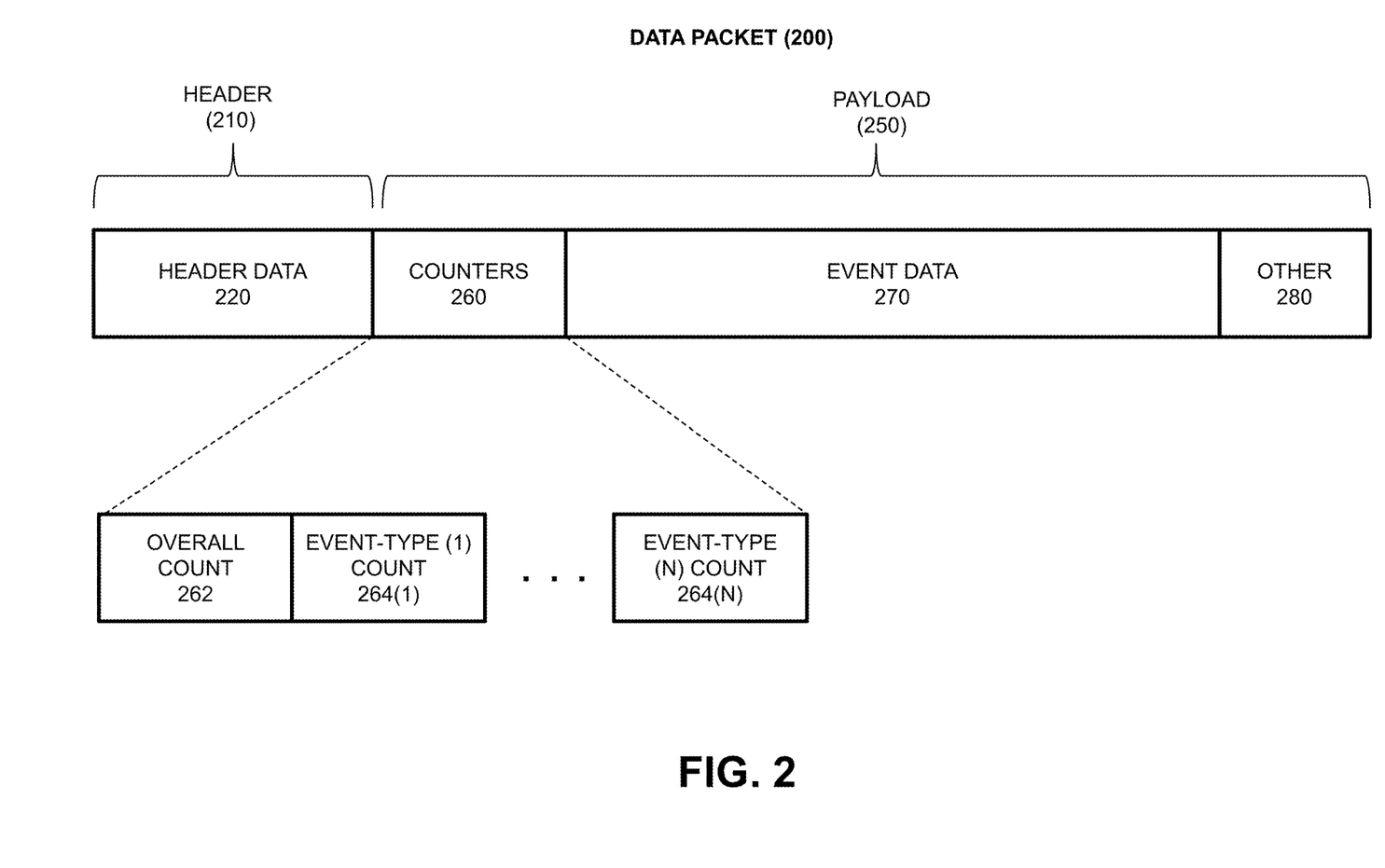
FIG. 2 illustrates an example format of a data packet, in accordance with an embodiment.

FIG. 2 illustrates an example format of a data packet 200, in accordance with an embodiment. In this example, the data packet 200 can include a header 210 and a payload 250. The data packet 200 may include other fields, if desired. The header 210 can include header data. For example, in an UDP packet, the header data 220 can include source port number, destination port number and length, and may also include Checksum. The header data can be configured with data fields according to the communication protocol being used.

The payload 250 can include counters 260 and event data 270 and, if desired, other data 280. The counters 260 (or their count information) can include an overall counter (or count) 262 and event-type counters 264 for each event-type. In this example, the event-type counters can include a counter for each event type (e.g., N counters, where N is the number of event-types available). It should be understood that the count information provided by the counters 260 can be configured in various ways to enable the receiving entity to determine whether any packets were lost (including their type(s)) over time in the sequence of transmitted packets. For example, as a further embodiment, the counters 260 may instead include event-type counters 264 for N−1 event-types along with the overall counter 262. Alternatively, the counters 260 can omit the overall counter 262 and include counters for the N event-types.

The event data 270 can include information from which to discern the event-type (e.g., the type of event which has been detected or has occurred) as well as other data related to the event or detection thereof. In some embodiments, a separate event-type data field may be incorporated into the header 210 or payload to facilitate ease of data processing and event-type identification, particularly where event data may incorporate additional information associated with the detected event. In some embodiments, the event-type can include a keepalive-type or no-event-detected-type, where no data, dummy data or the like may be provided in the field for event data 270.

Figure 3:
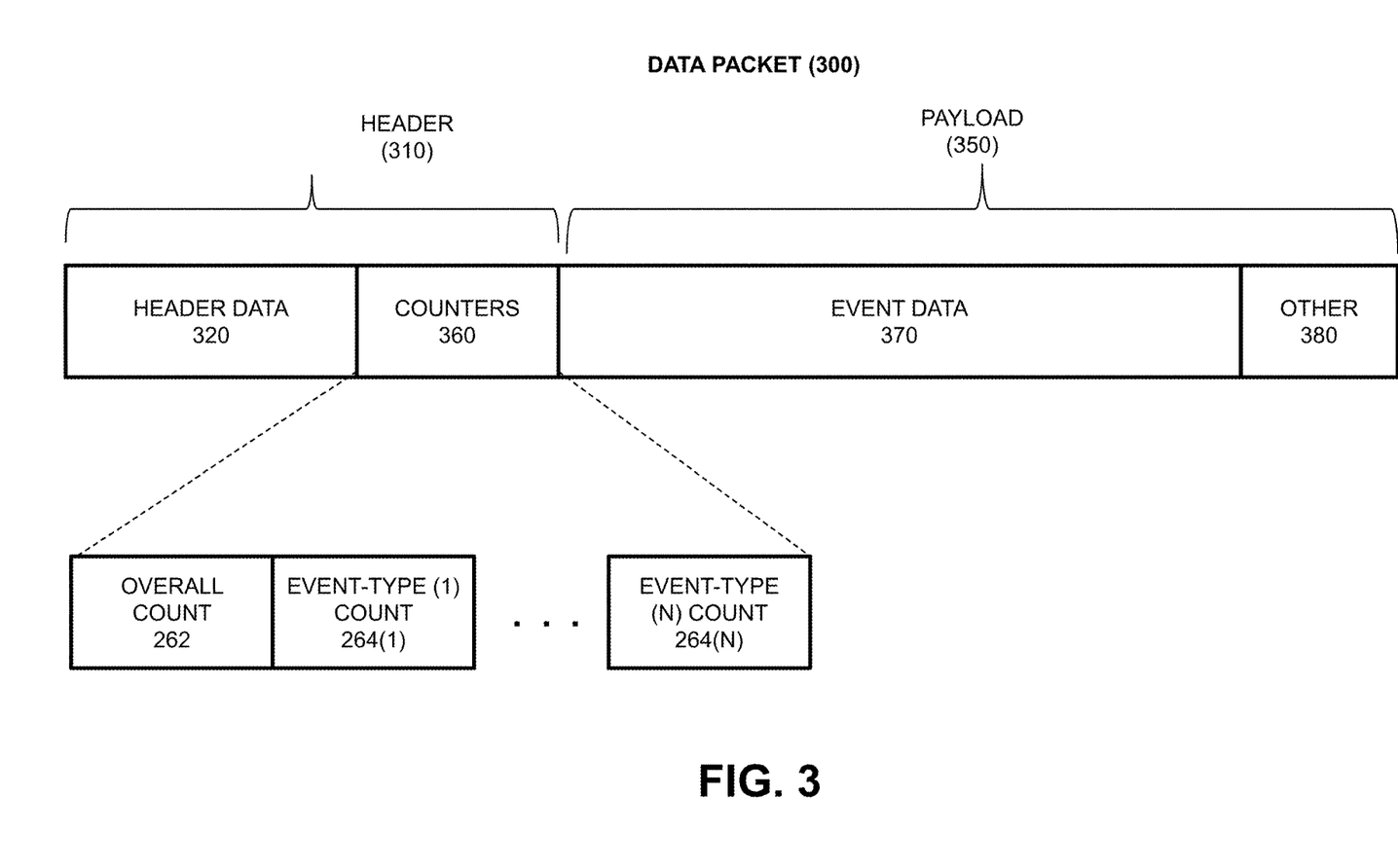
FIG. 3 illustrates another example format of a data packet, in accordance with a further embodiment.

FIG. 3 illustrates another example format of a data packet 300, in accordance with a further embodiment. In this example, the data packet 300 contains the same or similar fields as the data packet 200 in FIG. 2, except that the counters (or their count information) can be added or provided in the header. For example, the header 310 can include header data 320 and counters 360 (e.g., their count, etc.). The payload 350 can include event data 370 and, if desired, other data 380.

Figure 4:
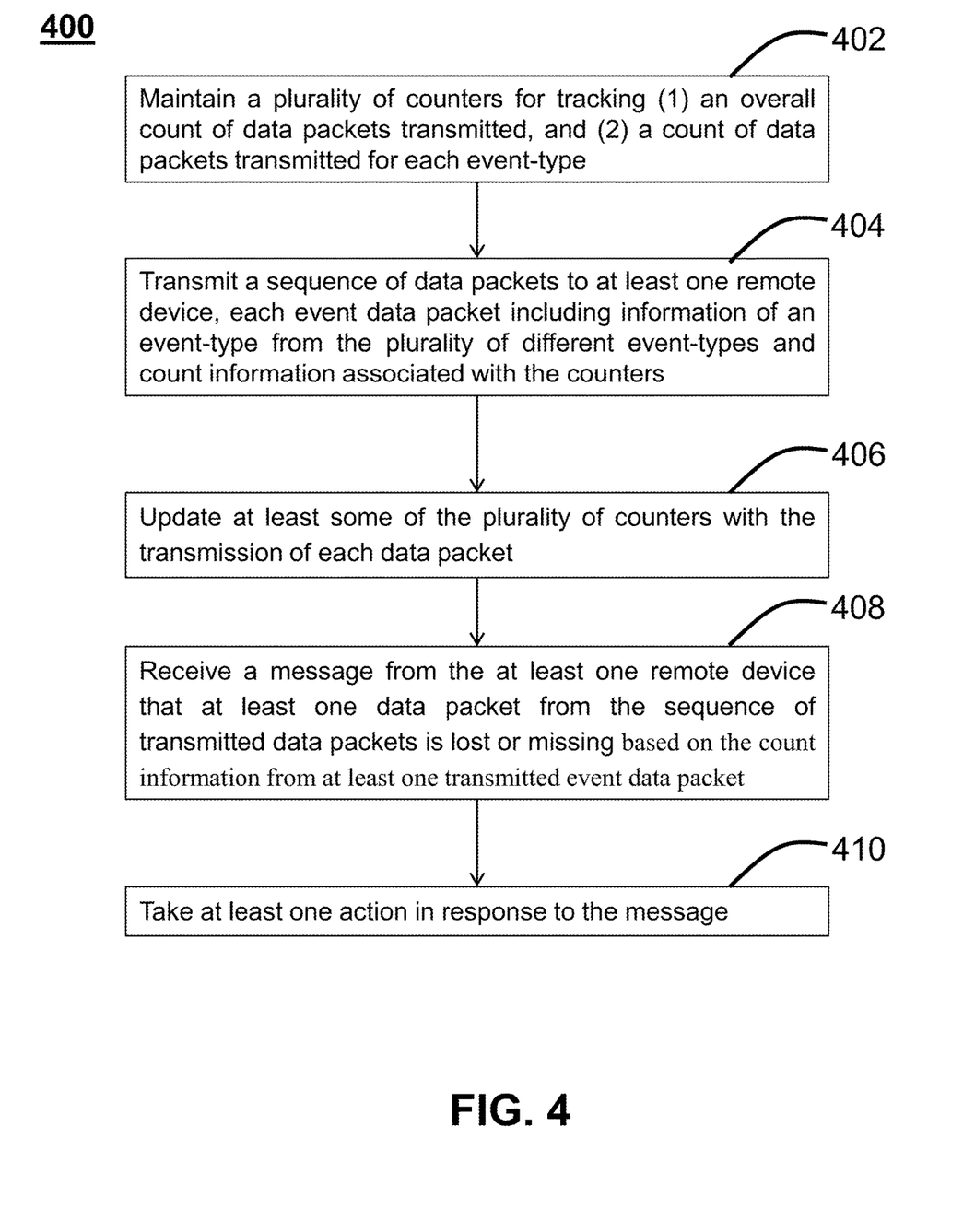
FIG. 4 is a flow chart illustrating example operations of a method by which a sequence of data packets is provided with count information for tracking a count of the transmitted packets for each event-type to facilitate detection of a lost packet in an event-based communication system, in accordance with an embodiment.

FIG. 4 is a flow chart illustrating example operations of a method 400 by which a sequence of data packets is provided with count information for tracking a count of the transmitted packets for each event-type to facilitate detection of a lost packet, in accordance with an embodiment. For the purposes of explanation, the method 400 will be described, for example, with reference to a transmitting entity such as a controller and its components (e.g., a controller 110 in FIG. 1).

The process begins at block 402 in which the controller maintains a plurality of counters for tracking (1) an overall count of data packets transmitted, and (2) a count of data packets transmitted for each event-type. For example, the counters can include an overall counter and a plurality of event-type counters, or combinations thereof (including those described herein).

At block 404, the controller can transmit a sequence of data packets to at least one remote device. Each data packet can include information of an event-type from the plurality of different event-types and count information associated with the counters. The count information can include information tracking (1) an overall count of data packets transmitted, and (2) a count of data packets transmitted for each event-type.

At block 406, the controller can update at least some of the plurality of counters with the transmission of each data packet. For example, in an embodiment, when a data packet is transmitted, the overall counter can be incremented regardless of the event-type, and the event-type counter for the particular event-type being transmitted also can be incremented.

At block 408, the controller can receive a message, via the communication device, from at least one remote device. The message can indicate that at least one data packet from the sequence of transmitted data packets is lost or missing based on the count information from at least one transmitted data packet. The count information can enable determination of the event-type of the at least one data packet that is lost. For example, the message can simply indicate one or more lost packets, a retransmission request for the lost packet(s), etc.

At block 410, the controller can take at least one action in response to the message. For example, the action can include a retransmission of the lost packet(s), a decision to take no action (e.g., if the lost packet is a keepalive packet), error notification to another entity, and so forth.

Figure 5:
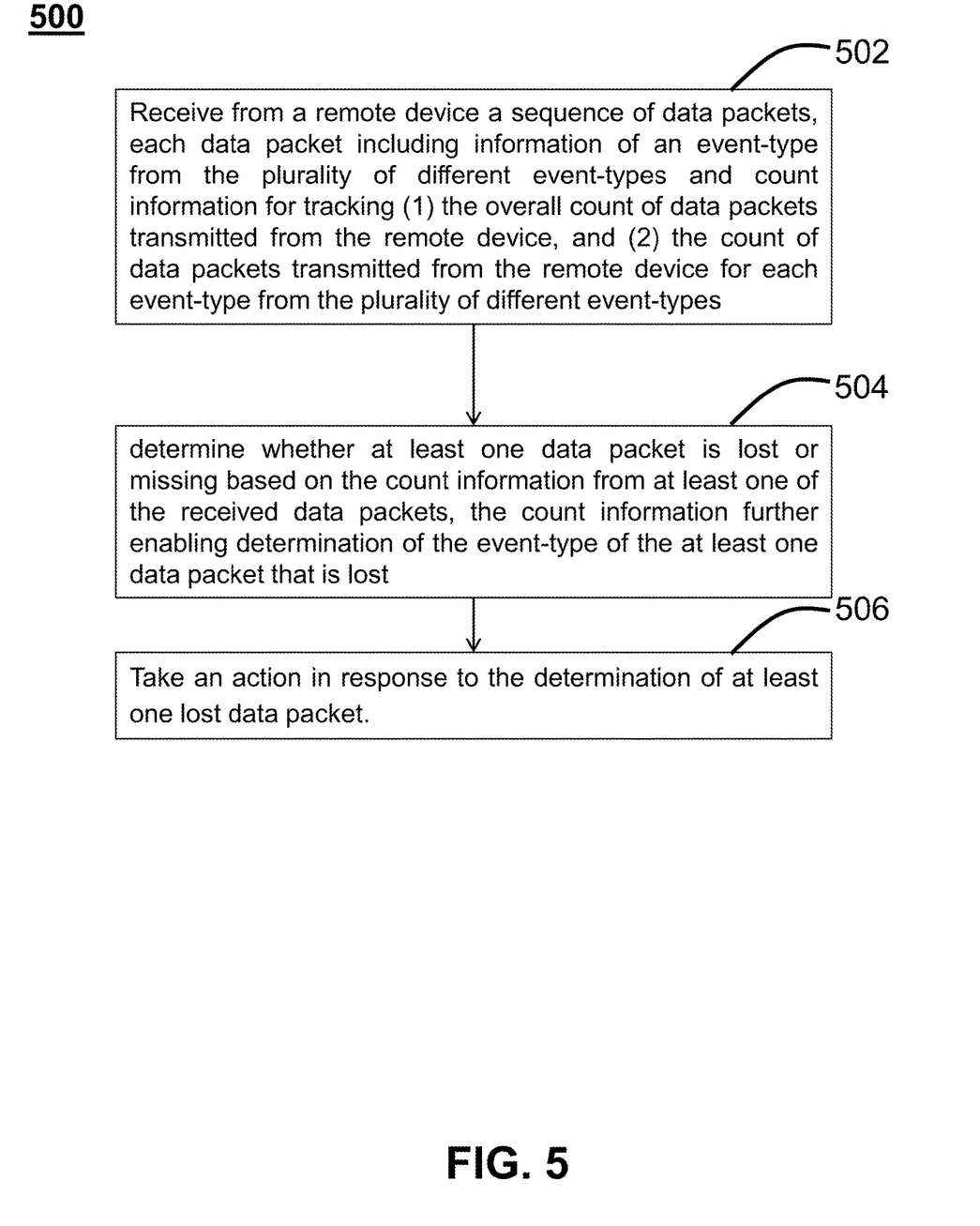
FIG. 5 is a flow chart illustrating example operations of a method by which a sequence of data packets is provided with count information for tracking a count of the transmitted packets for each event-type to facilitate detection of a lost packet in an event-based communication system, in accordance with an embodiment.

FIG. 5 is a flow chart illustrating example operations of a method 500 by which a sequence of data packets is provided with count information for tracking a count of the transmitted packets for each event-type to facilitate detection of a lost packet, in accordance with an embodiment. For the purposes of explanation, the method 500 will be described, for example, with reference to a receiving entity, such as a controller and its components (e.g., a controller 110 in FIG. 1).

The process 500 begins at block 502 in which the controller can receive from a remote device a sequence of data packets. Each data packet can include information of an event-type from the plurality of different event-types and count information for tracking (1) the overall count of data packets transmitted from the remote device, and (2) the count of data packets transmitted from the remote device for each event-type from the plurality of different event-types.

At block 504, the controller can determine whether at least one data packet is lost or missing and its event-type based on the count information from at least one of the received data packets. The count information can include the counters (or their count). The counters can include an overall counter and a plurality of event-type counters, or combinations thereof (including those described herein).

At block 506, the controller can take an action in response to the determination of at least one lost data packet. For example, the action can include transmitting a message to the remote device indicating the determination of at least one data packet which is lost. The message can be a retransmission request. The controller can receive the at least one data packet which was identified in the message as being lost from the remote device, in response to the message. Furthermore, the action can include informing at least one of its applications of the communication error for processing by the application, deciding to do nothing (e.g., ignore) when the lost packet is of a keepalive-type (or no event-detected type), and so forth.

Figure 6:
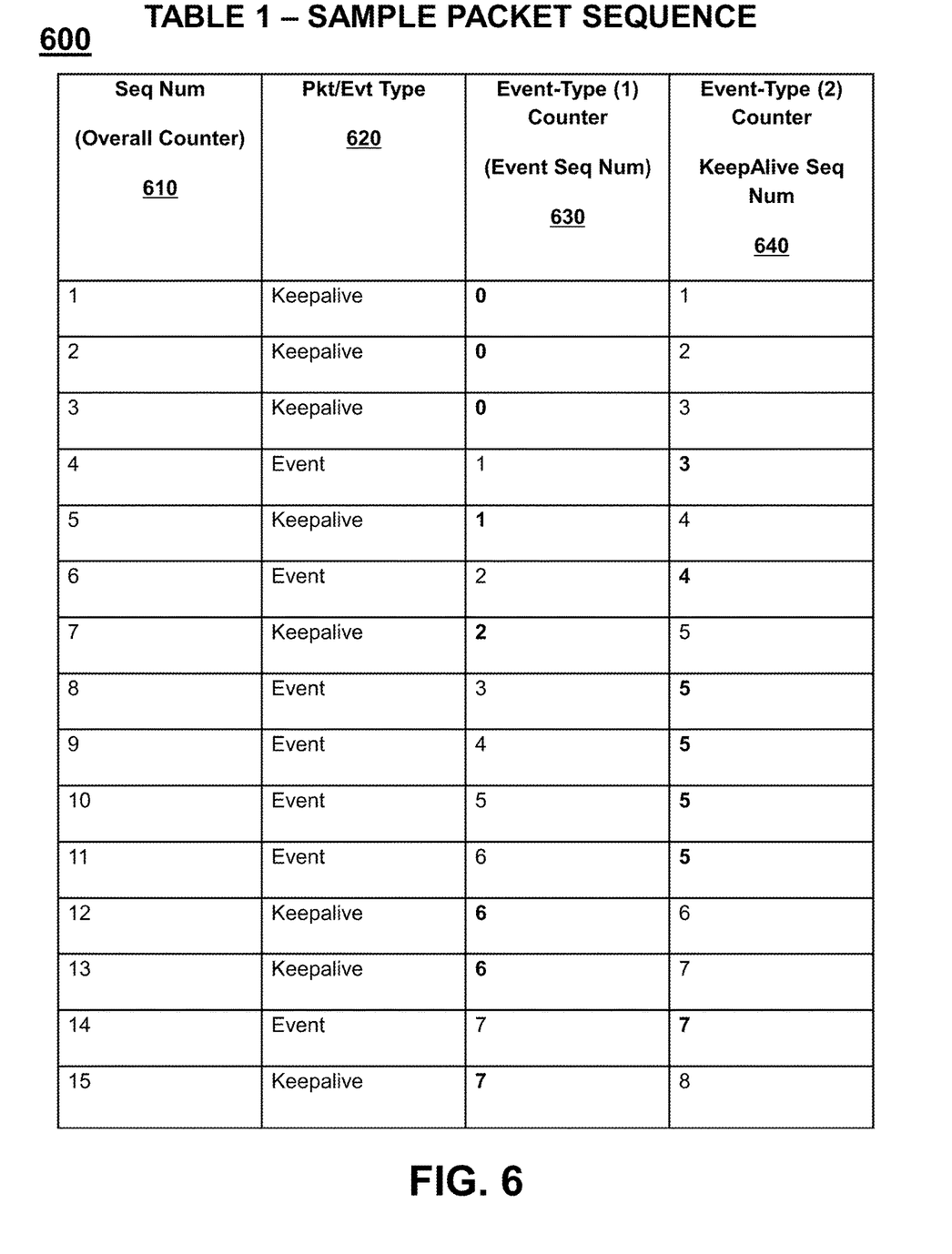
FIG. 6 is a Table showing example information, such as count information, for data packets transmitted sequentially, in accordance with an embodiment.

FIG. 6 is a Table 600 showing example information which may be obtained or determined from the count information from messages, such as sample data packets, which are transmitted sequentially to one or more remote devices, in accordance with an embodiment. The Table 600 includes a plurality of fields, such as an overall counter (or sequence number) 610, packet/event-type 620, event type (1) counter 630, and event-type (2) counter 640.

The packet/event-type 620 in the second column shows the type of packet transmitted. In this example, there are two packet/event-types for the packets, such as event data packet and keepalive data packet. The overall counter 610 in the first column shows the overall count (or overall sequence number), which is incremented for each packet, regardless of type. The event-type (1) counter 630 and event-type (2) counter 640 in the third and fourth column, respectively, show individual counts (or sequence numbers), which are incremented when the particular packet/event type is transmitted (or sent).

In this operational example, the receiving entity monitors the overall sequence number of received packets. If the receiving entity detects a gap (where the overall counter of the latest packet is not the next number in succession from the previously received packet's overall sequence number), it will know that it has missed one or more packets. It can then use the type counters to determine which type was missed and take appropriate action. The action can include, for example, request retransmission of the missing type of packet if multiple types are supported, ignore if keepalive-type or other types that do not critically affect the operation, enter fault condition, and so forth.

By way of further example, assuming that the receiving entity missed the event data packet with overall sequence number 4 (e.g., packet 4). When the receiving entity receives packet 5, it will detect that it missed packet 4. By inspecting the count information from the packet type sequence counters, the receiving entity can determine that this is the next keepalive packet and that it missed an "event" packet.

If, on the other hand, the receiving entity missed packet 2, after packet 3 is received, it would see the jump in the overall sequence number as well as the keepalive sequence number, indicating a missed keepalive packet.

If multiple packets are missed, for example, packets 8 to 12, the receiving entity will see gaps in the received overall sequence counter, the event sequence counter, and the keepalive sequence counter contained in the keepalive packet. The receiving entity can then determine that it missed both "keepalive" and "event" packets. However, the keepalive sequence counter gap is different than the overall sequence counter gap, so it could also use this information to know it missed event packets as well.

Since sequence counter values are finite, the system may need to also handle sequence counter rollover or reset (e.g., reset the counters such as to zero). The size of the counters can be dependent on a timeout period defining the loss of communication and other factors.

The above mechanism described in the example of FIG. 6 works well when two (2) event-types for the data packet are present. In various embodiments, the lost packet detection scheme can be extended to N packet types, which may involve having each packet type contain N sequence counters so that the receiving entity can detect which type of packet is missed. These counters can be configured to be large enough to handle the maximum number of packets that could be missed before other mechanisms are used to detect loss of communication (e.g., timeout).

Although the systems and methods described herein may be performed in combination with a communication protocol such as UDP, they may also be employed in combination with other communication protocols such as raw Ethernet or communication protocols without error correction or recovery, where communication speed is important.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. For example, it should be understood that the systems and methods described herein can be employed for detecting lost packets with communication systems, which employ protocols that do not provide for error correction or recovery or any guarantee of data packet delivery.

Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

I claim:

1. A method of detecting a lost packet in an event-based communication system configured to enable communication of a plurality of different event-types using a communication protocol without error correction or recovery, the method comprising:
   maintaining a plurality of counters for tracking (1) an overall count of data packets transmitted, and (2) a count of data packets transmitted for each event-type;
   transmitting a sequence of data packets to at least one remote device, each data packet including information of an event-type from the plurality of different event-types and count information associated with the counters for tracking (1) the overall count of data packets transmitted, and (2) the count of data packets transmitted for each event-type from the plurality of different event-types, at least some of the plurality of counters being updated with the transmission of each data packet;
   receiving a message from the at least one remote device that at least one data packet from the sequence of transmitted data packets is lost based on the count information from at least one transmitted data packet, the count information enabling determination of the event-type of the at least one data packet that is lost; and
   taking at least one action in response to the message.

2. The method according to claim 1, wherein the count information of a data packet comprises a current overall count of the number of data packets transmitted, and current event-type count of the number of data packets transmitted for each of the event-types, when the data packet is transmitted.

3. The method according to claim 1, wherein the communication protocol comprises User Datagram Protocol.

4. The method according to claim 3, wherein the count information is provided in a payload of the data packet.

5. The method according to claim 1, wherein the action comprises selectively re-transmitting the lost data packet according to its event-type.

6. The method according to claim 1, wherein the event-types include a keepalive-type of packet.

7. The method according to claim 6, further comprising:
   resetting the plurality of counters after data packets of a keepalive-type have been transmitted consecutively for a time period, which satisfies a reset time period or condition.

8. The method according to claim 1, wherein the sequence of data packets are multicasted to a plurality of remote devices, which comprise a plurality of industrial controllers that are configured to perform functions according to event information received from the sequence of data packets, the functions being associated with an operation or monitoring of an industrial process or system or equipment associated therewith.

9. A method of detecting a lost packet in an event-based communication system configured to enable communication of a plurality of different event-types using a communication protocol without error correction or recovery, the method comprising:
   receiving from a remote device a sequence of data packets, each data packet including information of an event-type from the plurality of different event-types and count information from a plurality of counters for tracking (1) an overall count of data packets transmitted from the remote device, and (2) a count of data packets transmitted from the remote device for each event-type from the plurality of different event-types;
   determining whether at least one data packet is lost based on the count information from at least one of the received data packets, the count information further enabling determination of the event-type of the at least one data packet that is lost; and
   taking an action in response to the determination of at least one lost data packet.

10. The method according to claim 9, wherein the action comprises transmitting a message to the remote device for the determined at least one data packet which is lost, the method further comprising:
    receiving the at least one data packet which was identified in the message as being lost from the remote device, in response to the message.

11. The method according to claim 9, wherein the count information of a data packet comprises a current overall count of the number of data packets transmitted, and current event-type count of the number of data packets transmitted for each of the event-types, when the data packet is transmitted.

12. The method according to claim 9, wherein the communication protocol comprises User Datagram Protocol.

13. The method according to claim 12, wherein the count information is provided in a payload of the data packet.

14. The method according to claim 9, wherein the event-types include a keepalive-type of packet.

15. A system for detecting a lost packet in an event-based communication system configured to enable communication of a plurality of different event-types using a communication protocol without error correction or recovery, the system comprising:
- a memory;
- a communication device;
- at least one processor configured:
  - to maintain a plurality of counters for tracking (1) an overall count of data packets transmitted, and (2) a count of data packets transmitted for each event-type;
  - to transmit, via the communication device, a sequence of data packets to at least one remote device, each data packet including information of an event-type from the plurality of different event-types and count information associated with the counters for tracking (1) the overall count number of data packets transmitted, and (2) the count of data packets transmitted for each event-type from the plurality of different event-types, at least some of the plurality of counters being updated with the transmission of each data packet;
  - to receive, via the communication device, a message from the at least one remote device that at least one data packet from the sequence of transmitted data packets is lost based on the count information from at least one transmitted data packet, the count information enabling determination of the event-type of the at least one data packet that is lost; and
  - to take at least one action in response to the message.

16. The system according to claim 15, the count information of a data packet comprises a current overall count of the number of data packets transmitted, and current event-type count of the number of data packets transmitted for each of the event-types, when the data packet is transmitted.

17. The system according to claim 15, wherein the communication protocol comprises User Datagram Protocol.

18. The system according to claim 17, wherein the count information is provided in a payload of the data packet.

19. The system according to claim 15, wherein the action comprises selectively re-transmitting the lost data packet according to its event-type.

20. The system according to claim 15, wherein the event-types include a keepalive-type of packet.

21. The system according to claim 20, wherein the at least one processor is further configured to reset the plurality of counters after data packets of a keepalive-type of packet type have been transmitted consecutively for a time period, which satisfies a reset time period or condition.

22. The system according to claim 15, wherein the sequence of data packets are multicasted to a plurality of remote devices, which comprise a plurality of industrial controllers that are configured to perform functions according to event information received from the sequence of data packets, the functions being associated with an operation or monitoring of an industrial process or system or equipment associated therewith.

23. A system for detecting a lost packet in an event-based communication system configured to enable communication of a plurality of different event-types using a communication protocol without error correction or recovery, the system comprising:
- a memory;
- a communication device;
- at least one processor configured:
  - to receive from a remote device, via the communication device, a sequence of data packets, each data packet including information of an event-type from the plurality of different event-types and count information from a plurality of counters for tracking (1) an overall count of data packets transmitted from the remote device, and (2) a count of data packets transmitted from the remote device for each event-type from the plurality of different event-types;
  - to determine whether at least one data packet is lost based on the count information from at least one of the received data packets, the count information further enabling determination of the event-type of the at least one data packet that is lost; and
  - to take action in response to the determination of at least one lost data packet.

24. The system according to claim 23, wherein the action comprises transmitting a message to the remote device for the determined at least one data packet which is lost, and the at least one processor is further configured to receive, via the communication device, the at least one data packet which was identified in the message as being lost from the remote device, in response to the message.

25. The system according to claim 23, wherein the count information of a data packet comprises of a current overall count of the number of data packets transmitted, and current event-type count of the number of data packets transmitted for each of the event-types, when the data packet is transmitted.

26. The system according to claim 23, wherein the communication protocol comprises User Datagram Protocol.

27. The system according to claim 26, wherein the count information is provided in a payload of the data packet.

28. The system according to claim 23, wherein the event-types include a keepalive-type of packet.

29. A non tangible non-transitory computer readable medium storing computer code, which when executed by at least one processor, implements a process of detecting a lost packet in an event-based communication system configured to enable communication of a plurality of different event-types using a communication protocol without error correction or recovery, the process comprising:
- maintaining a plurality of counters for tracking (1) an overall count of data packets transmitted, and (2) a count of data packets transmitted for each event-type;
- transmitting a sequence of data packets to at least one remote device, each data packet including information of an event-type from the plurality of different event-types and count information associated with the counters for tracking (1) the overall count number of data packets transmitted, and (2) the count of data packets transmitted for each event-type from the plurality of different event-types, at least some of the plurality of counters being updated with the transmission of each data packet;
- receiving a message from the at least one remote device that at least one data packet from the sequence of transmitted data packets is lost based on the count information from at least one transmitted data packet, the count information enabling determination of the event-type of the at least one data packet that is lost; and
- taking at least one action in response to the message.

30. A non-transitory computer readable medium storing computer code, which when executed by at least one processor, implements a process of detecting a lost packet in an event-based communication system configured to enable communication of a plurality of different event-types using a communication protocol without error correction or recovery, the process comprising:
- receiving from a remote device a sequence of data packets, each data packet including information of an event-type from the plurality of different event-types and count information from a plurality of counters for tracking (1) an overall count of data packets transmitted from the remote device, and (2) a count of data packets transmitted from the remote device for each event-type from the plurality of different event-types;
- determining whether at least one data packet is lost based on the count information from at least one of the received data packets, the count information further enabling determination of the event-type of the at least one data packet that is lost; and
- taking an action in response to the determination of at least one lost data packet.

* * * * *